United States Patent [19]

Sanchez

[11] Patent Number: 5,528,734
[45] Date of Patent: Jun. 18, 1996

[54] PRINTER CONTROL SYSTEM WITH COPIER TYPE DOCUMENT HANDLING

[75] Inventor: George A. Sanchez, Fremont, Calif.

[73] Assignee: Canon Information Systems, Inc., Costa Mesa, Calif.

[21] Appl. No.: 252,570

[22] Filed: May 31, 1994

[51] Int. Cl.$^6$ .................................................. G06K 15/00
[52] U.S. Cl. ............................................ 395/115; 395/117
[58] Field of Search .................................. 395/115, 116, 395/106, 117; 355/202, 204

[56] References Cited

U.S. PATENT DOCUMENTS

| | | | |
|---|---|---|---|
| 4,460,975 | 7/1984 | Torkelsen et al. | 364/900 |
| 4,575,214 | 3/1986 | Carley | 355/3 R |
| 4,829,468 | 5/1989 | Nonaka et al. | 364/900 |
| 4,935,821 | 6/1990 | Sano et al. | 358/427 |
| 4,947,345 | 8/1990 | Paradise et al. | 364/519 |
| 4,949,190 | 8/1990 | Thompson | 358/426 |
| 4,999,672 | 3/1991 | Rice, Jr. et al. | 355/202 |
| 5,087,979 | 2/1992 | Schaertel | 358/296 |
| 5,091,747 | 2/1992 | Tsai | 355/202 |
| 5,253,077 | 10/1993 | Hasegawa et al. | 358/404 |
| 5,313,565 | 5/1994 | Mori | 395/118 |
| 5,454,066 | 9/1995 | Tsai | 395/106 |
| 5,454,067 | 9/1995 | Tsai | 395/106 |
| 5,461,469 | 10/1995 | Farrell et al. | 355/321 |

FOREIGN PATENT DOCUMENTS

| | | |
|---|---|---|
| 478334 | 4/1992 | European Pat. Off. . |
| 537029 | 4/1993 | European Pat. Off. . |

OTHER PUBLICATIONS

"Intercepting API Calls" by Mike Klein; DLLs and Memory Management; pp. 246–247, Prentice Hall, 1992.

Primary Examiner—Mark R. Powell
Assistant Examiner—Tracy M. Legree
Attorney, Agent, or Firm—Fitzpatrick, Cella, Harper & Scinto

[57] ABSTRACT

A memory in a print control arrangement stores one or more application program blocks that control information signal processing, a printer driver block that controls conversion of information signals to print data and a document formatting block. A processor operates on the information signals according to control signals from the memory and operates to convert information signals to be printed according to control signals from the print driver block. Print data sent from the processor to a print spooler is intercepted and reformatted according to user provided formatting parameters in response to control signals of the document formatting block. The reformatted print data is sent to the print spooler.

25 Claims, 11 Drawing Sheets

PRINTER CONTROL SYSTEM WITH COPIER TYPE DOCUMENT HANDLING

BACKGROUND OF THE INVENTION

1. Field Of The Invention

The invention relates to printing control and more particularly to printer control in a processing system that performs document handling and formatting independent of the source of print data and of the printing device.

2. Description of The Related Art

In conventional computer systems, printing is performed by a printing device coupled to a system processor under control of a print driver. The print driver is adapted to convert data processed according to an application program to print data acceptable by the printing device. Large scale systems may include a printer or a copier/printer that provides such document handling features as grouping, sorting and duplex copying. These document handling features are generally incorporated in mechanical structures of the printer or copier/printer.

Printers for small systems such as personal computers usually lack the mechanisms to provide automatic document handling and the user must manually, group and sort documents and must manually produce duplex copies by repeating the printing operation. Alternatively, some document handling features may be incorporated in application programs such as word processors. As a result, a user must select print features available in the printer or in each application but cannot be assured that a general group of document handling features are available for all applications and all printers that may be used.

In the Microsoft® Windows operating system (windows environment), the data for printing from an application is coupled to a windows print driver through a windows graphics device interface. The windows print driver, which includes a spooler, converts the application data from the graphics device interface to print data and the print data therefrom is sent to the spooler which, in turn, stores the print data and any inserted format commands for outputting to the printer. The windows spooler provides spooling for all application programs through the windows print driver and its functions are controlled by windows system commands rather than application commands.

The windows print driver operates to send commands to the spooler that control the paging performed by the printer. The commands sent to the windows spooler include OpenJob(), StartSpoolPage(), WriteSpool(), EndSpoolPage() and CloseJob() which cause the processor to store the print data from the windows printer driver in a predetermined order for printing. There are, however, no document handling commands that operate to perform document handling such as grouping of pages, sorting of pages, duplex copying and reversing page order. Such document handling features may or may not be included in the application or in the printer.

SUMMARY OF THE INVENTION

It is an object of the invention to provide a prescribed set of document handling features which are independent of the application providing print data and of the printer attached to the system.

In accordance with the invention, print data from an application source that is destined for a print spooler is intercepted and reformatted according to the user selected document features. The reformatted print data is forwarded to the print spooler so that features such as page grouping, page sorting and duplex copying may be provided independent of the application source or the printing device.

The invention is directed to a print control system in which a memory stores one or more application program blocks to control processing of information signals and a printer driver block to control conversion of information signals to print data. A processor operates on the information signals according to control signals of the memory and converts information signals produced in response to application block control signals into print data, the conversion being responsive to printer and the print control driver control signals. The processor sends the print data to a spooler coupled a printing device.

According to a first aspect of the invention, the memory further includes a document format block. The processor responds to control signals from the print format block to intercept the print data and to reformat the print data according to document formatting signals from the document format block. The reformatted print data is sent to the spooler.

According to another aspect of the invention, the document format block provides interception and reformatting of print data independent of the conversion of information signals to print data by control signals of the print driver block. Advantageously, a prescribed set of printer document handling features may be selected by a user to reformat the document independent of the source providing the data or the printer.

According to yet another aspect of the invention, the intercepted print data produced according to the printer driver control signals are stored under control of the document format block control signals. After the print data is stored, it is reformatted according to the document format block control signals and sent to the spooler.

According to yet another aspect of the invention, the document format block control signals include signals that modify the stored data sent to the spooler to change the paging order of the print data.

According to yet another aspect of the invention, the document format block print control signals include signals that modify the stored print data sent to the spooler to group pages.

According to yet another aspect of the invention, the document format block print control signals include signals that modify the stored print data sent to the spooler to sort pages.

According to yet another aspect of the invention, the document format block print control signals include signals that modify the stored print data sent to the spooler to produce duplex copies.

In a embodiment illustrative of the invention, a main memory of a windows environment computer system is partitioned into blocks which respectively store a windows application block to control processing of information signals, a windows printer driver block to control conversion of application information to print data, a document formatting block, and a window spooler block. A processor operates on the information signals according to control signals from the windows application block and converts information signals to be printed produced by the windows application block control signals to print data and windows spooler command signals. The windows spooler block causes the processor to store the print data in a spooler portion of the memory and then causes the processor to output the print data to a printing device. The document format block controls the processor so that the windows spooler command signals are intercepted and the print data is processed according to document format block control signals. The intercepted print data is reformatted and the reformatted print data is output to the spooler using user provided document handling parameters from the document format block.

The features and advantages of the invention will become apparent from the following detailed description of preferred embodiments thereof taken together with the accompanying drawings.

DETAILED DESCRIPTION OF THE PREFERRED EMBODIMENT

Figure 1:
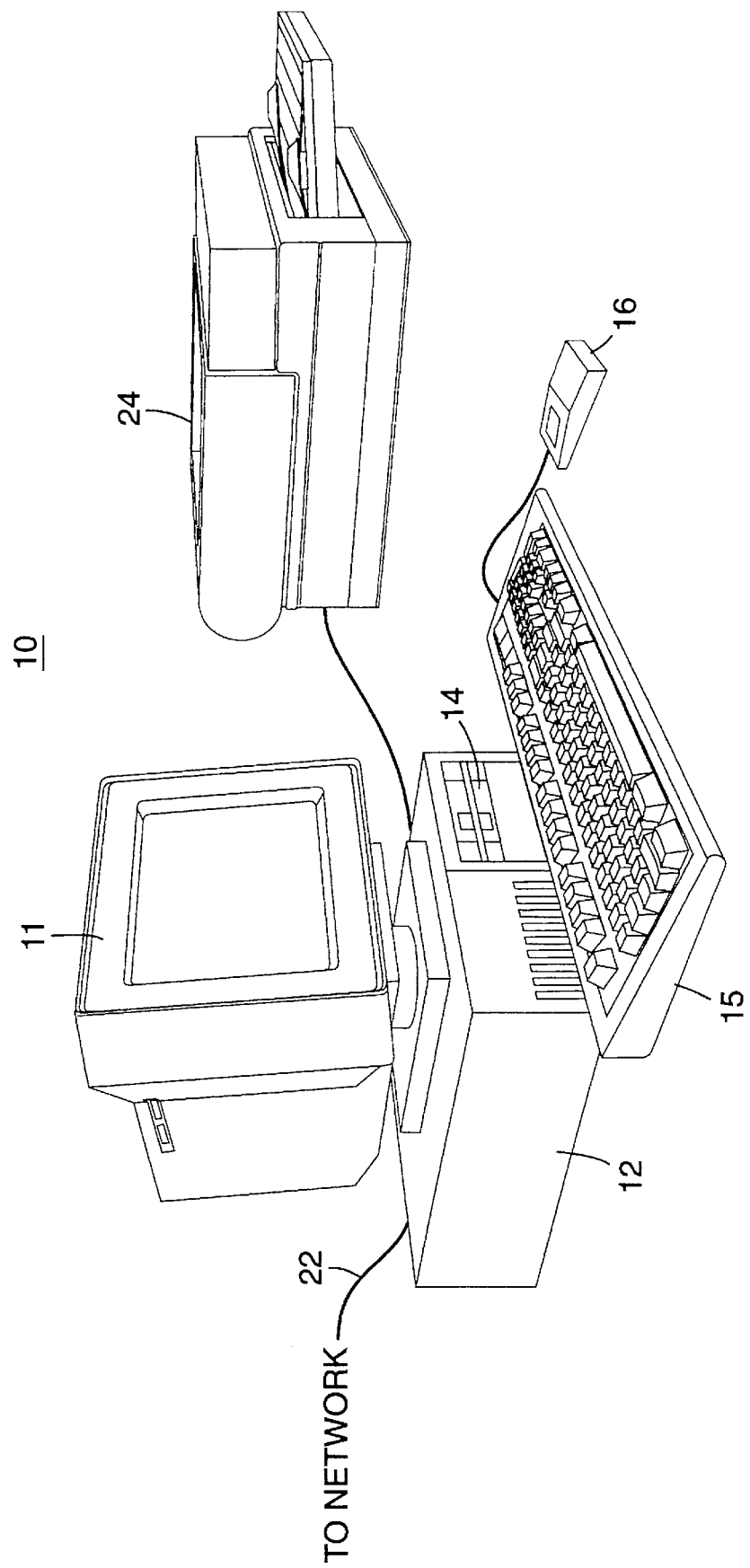
FIG. 1 shows a representation of the outward appearance of a computer system embodying the invention.

FIG. 1 represents the outward appearance of a computer system 10 illustrative of the invention. In FIG. 1, the computer system 10 contains a computer module 12, user input devices such as a keyboard 15 and a pointer 16, a display 11 and a printer 24. As is well known, the keyboard 15 and the pointer 16 may be replaced by a pen coordinate input device. A hard disk 14, a memory and a processor (both not shown) are included in the computer module 12 to provide processing and storage functions. The computer module 12 is coupled to each of the user input devices, the display 11 the printer 24 and to a network (not shown) through a cable 22.

The user input devices 15 and 16 provide user commands and data and user computer control information as is well known. The display 11 displays information sent from the computer module 12 according to commands from the computer module 12 and the user input devices 15 and 16. The printer 24 receives print data from the computer module 12 and produces hard copy documents and may also include copier functions. Other devices such as an auxiliary disk and a scanner may be added to the system 10.

Figure 2:
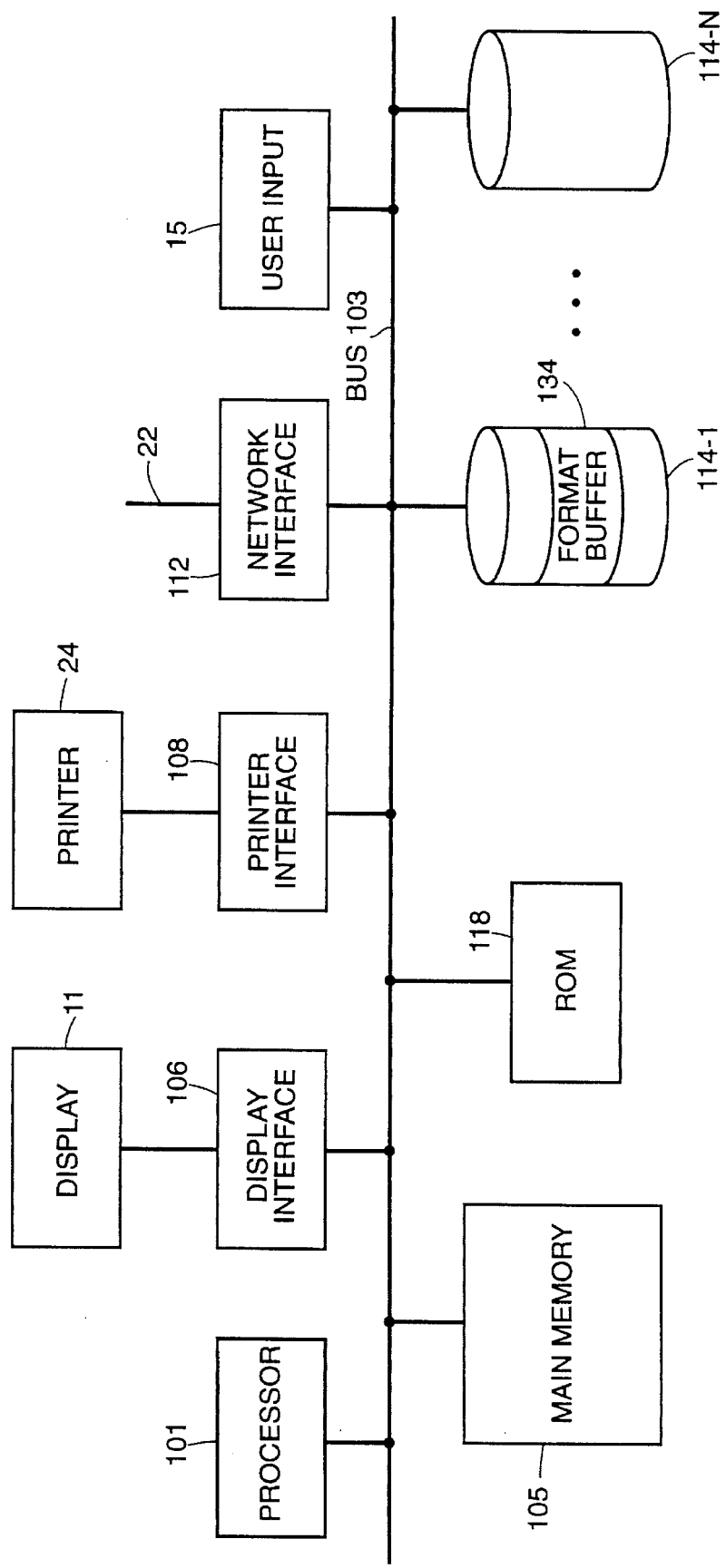
FIG. 2 depicts a general block diagram of the computer system of FIG. 1.

FIG. 2 depicts a general block diagram of the computer system 10. As shown in FIG. 2, the computer system 10 incorporates a processor 101, a bus 103, a main memory 105, a read only memory (ROM) 110, disks 114-1 to 114-N, the user input device 15, a printer interface 108, the printer 24, a display interface 106, the display 11 and a network interface 112 coupled to network cable 22. Each of the units shown in FIG. 2 is coupled to the bus 103 which operates to transfer signals among the units according to instructions from the main memory 105 and ROM 110. Data to be displayed is sent to the display 11 through the bus 103 and the display interface 106 under control of the processor 101. Print data is sent from the processor 101 to the printer 24 through the bus 103 and the printer interface 108 and user input signals are received from the user input device 15 via bus 103 under control of the processor 101.

Figure 3:
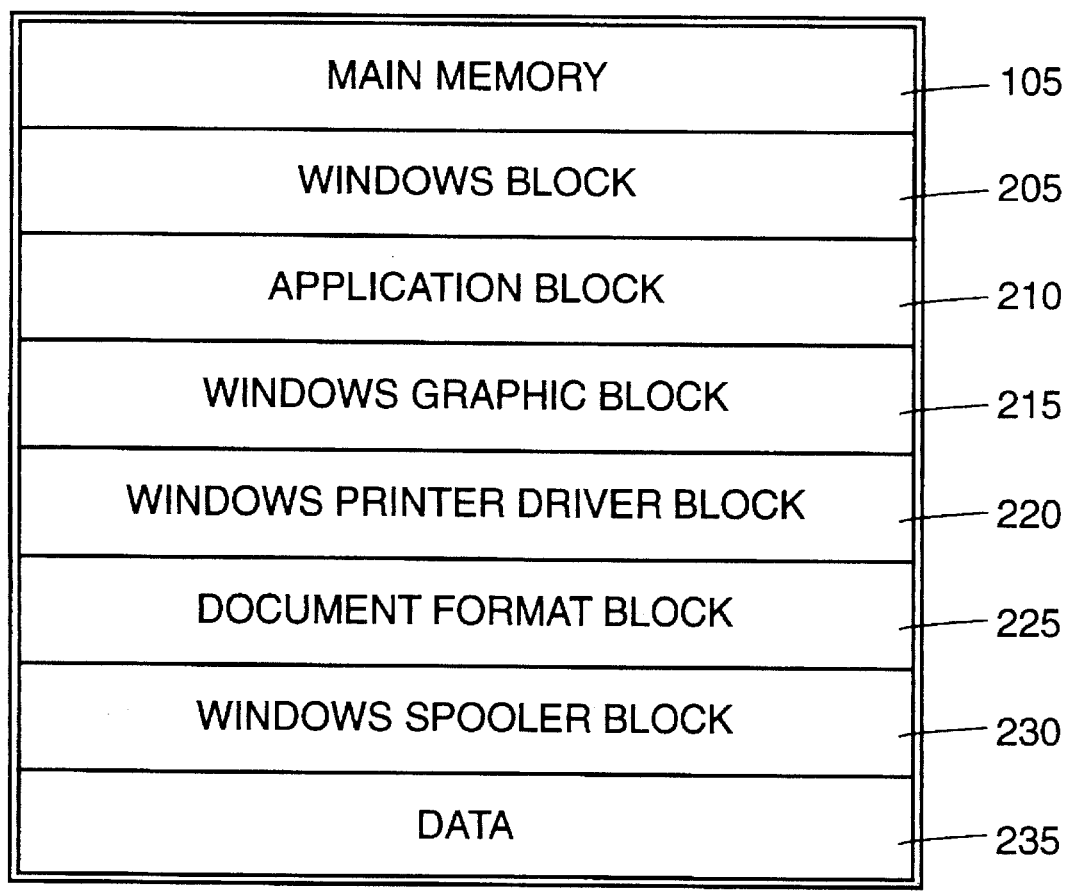
FIG. 3 shows the arrangement of the memory of the computer system of FIG. 2.

The main memory 105 is a random access memory (RAM) that stores information being processed and information to control the processing performed by processor 101 and is generally partitioned into blocks. The block arrangement of the main memory 105 for operation in a windows environment is shown in greater detail in FIG. 3. Referring to FIG. 3, the main memory has a windows block 205, one or more application blocks 210, a windows graphics device interface block 215, a windows printer driver block 220, a document or print format block 225, a windows spooler block 230 and a data area 235.

The windows block 205 stores control signals that create and control the windows environment for the processor 101. The application block 210 contains instructions adapted to perform the processing of a particular program which may, for example, be a windows environment program such as a word processing program or a data base program. The windows graphics device interface block 215 stores instructions necessary to transfer information of the application to graphics devices such as the display 11 and the printer 24 and the printer driver block 220 stores signals necessary to control the conversion of application information to be output to the printer 15 to print data according to requirements of a particular printing device.

In the windows environment set up by instructions stored in the windows block 205, the windows spooler block 230 is included in the main memory 105 to control the storage and outputting of print data and print control signals obtained from application processing for outputting to the printer 24. The windows spooler operates to store print data in memory so that data transfers to the printer may be queued for printing without interfering with the operation of the application program.

Figure 4:
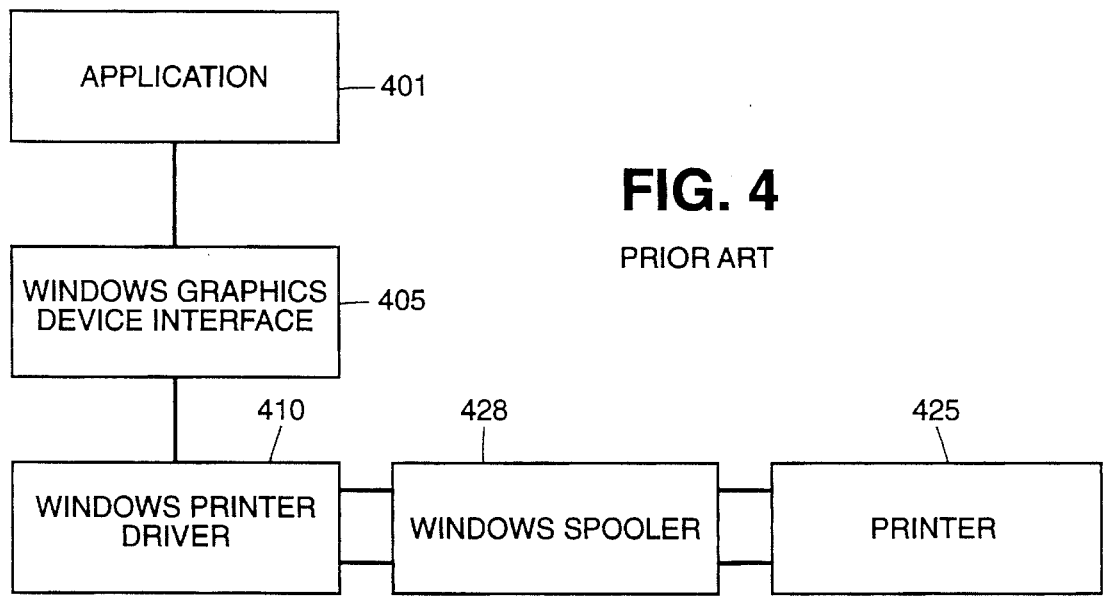
FIG. 4 illustrates the functions in the printing operation of the system as shown in FIG. 2 according to the prior art.

Application information to be output by the printer 24 is processed according to control signals of the windows printer driver so that application information for printing is transformed into print data used by the spooler to control the printer to produce a document. FIG. 4 illustrates the process of transferring information to be printed from the processor to the spooler in a windows environment according the prior art. Shown in FIG. 4, are application control 401, a graphics device interface control 405, a print driver control 410, a spooler control 420, and a printer control 425, all operating to direct the operations of the processor 101. Application data information from the application processed in the processor 101 of FIG. 2 is passed from the application control 401 through the graphics device interface control 405 to the printer driver control 410 which controls the conversion of the application information to print data.

The set of control instructions of the windows print driver 410 loaded in printer driver block 220 of FIG. 3 operates with the selected application currently printing to convert the information data to be printed to print data acceptable by the printer 15. The print data output from the printer driver 410 is specific to the type of printer being used. In the windows environment, the print data obtained from the windows print driver is sent to the windows spooler included in a portion of the data area 235 of the main memory 105. The stored spooler print data is then transferred to the printer control 425 in printer 24 under control of the windows spooler block 230 according to the printer operation. In its operation, the windows printer driver 410 generates window spooler commands that are transferred to the windows spooler 420 to control the printing of the print data.

While one application may incorporate one set of document handling features, another application could provide a completely different set of document handling features or may not provide one or more document handling features needed by a user. As a result, a user is required to set document handling features for each application individually and may not be able to obtain a particular document handling feature in one or more applications.

Figure 5:
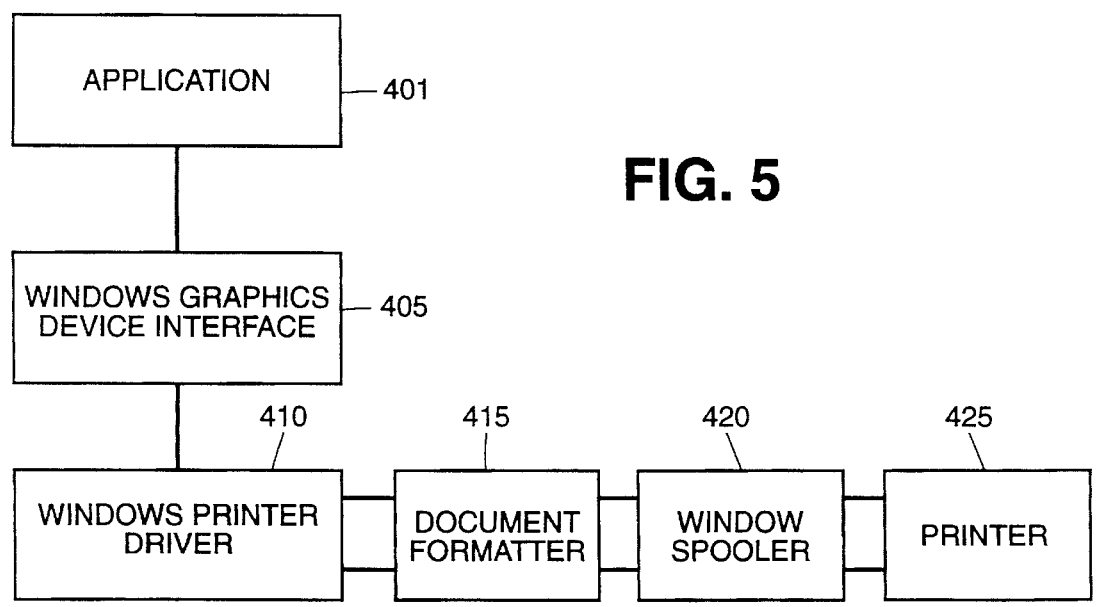
FIG. 5 shows the functions in the printing operations of the system shown in FIG. 2 illustrative of the invention.

In accordance with the invention, the document format block 225 is included in the main memory 105 to provide a predetermined set of document handling features independent of the application from which print data is obtained and independent of the printing device being used. The operation of the document format block 225 is illustrated in FIG. 5. The control elements of FIG. 5 correspond to those of FIG. 4 except that a document formatter control 415 is coupled between the window print driver 410 and the window spooler 420 so as to intercept spooler commands.

As shown in FIG. 5, the print data and the windows spooler commands in the processor 101 destined for the spooler function 420 are intercepted under control of signals from document format block 225 of FIG. 3. The document formatter 415 has a dynamic link library stored in the document format block 225 and operative to control reformatting of the received print data and windows spooler commands. The dynamic link library provides the predetermined set of document handling features regardless of the application that is the source of the print data or of the printing device connected to the windows spooler.

The document formatter 415 causes the print data and associated document control signals to be stored in a format buffer 134 of one of the disks 114-1 through 114-N of FIG. 2. In addition, the windows spooler commands are intercepted by the document formatter 415 which then reformats the document print data according to user selected operations of the predetermined set of document handling features of document formatter. As a result, the print data stored in the format buffer 134 is reformatted and outputted with user specified document handling features.

Figure 6:
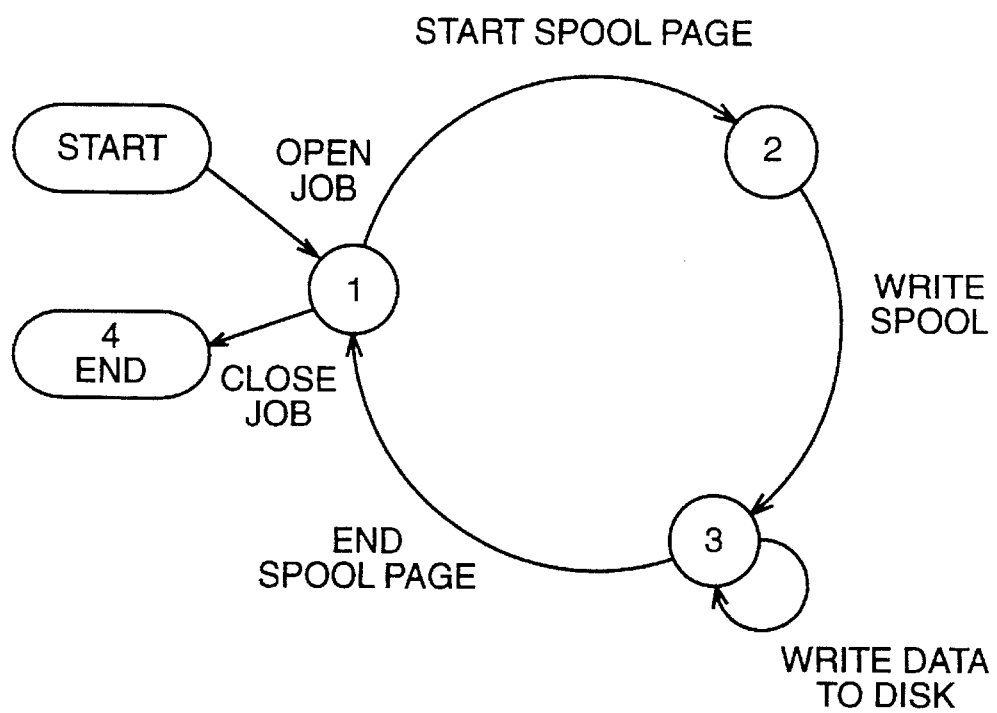
FIG. 6 is a state diagram illustrating the print operation sequencing of the system of FIG. 2.
Figure 7:
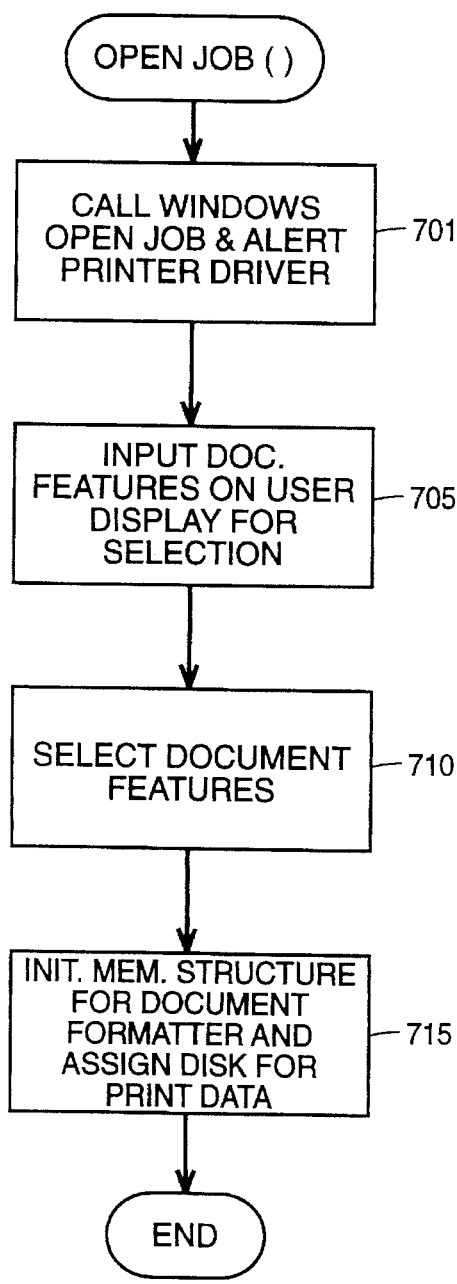

FIG. 6 is a state diagram illustrating the print control operations according to the invention. Shown in FIG. 6 are the states 1 through 4 of the print operations. When an OpenJob() command is issued by the printer driver control 410 to the windows spooler control 420, it is intercepted by the document formatter control 415 and state 1 is entered. The operations of the document formatter control 415 in state 1 are shown in FIG. 7. In response to the intercepted OpenJob() command, step 701 is entered wherein the Windows system OpenJob() command is called and the print driver is alerted. User selection of one of the document handling features of sorting, grouping and duplex printing is then performed in steps 705 and 710 with a Windows user interface on the display 11. After the document handling has been selected, step 715 is entered wherein a file in the main memory 105 is opened for the print operations and a disk is assigned to provide a buffer to store the print data generated by processor 101 as per the printer driver control 410. The disk that is assigned may be located in another computer system coupled to the system 10 via the network interface 112 and cable 22.

State 2 in FIG. 6 is entered from state 1 when a StartSpoolPage() command from the windows print driver control 410 to the Windows spooler control 420 is intercepted by the document formatter control 415. In state 2, the document formatter control 415 sends a signal to the print driver control indicating that a page has been accepted by the document formatter control 415.

Figure 8:
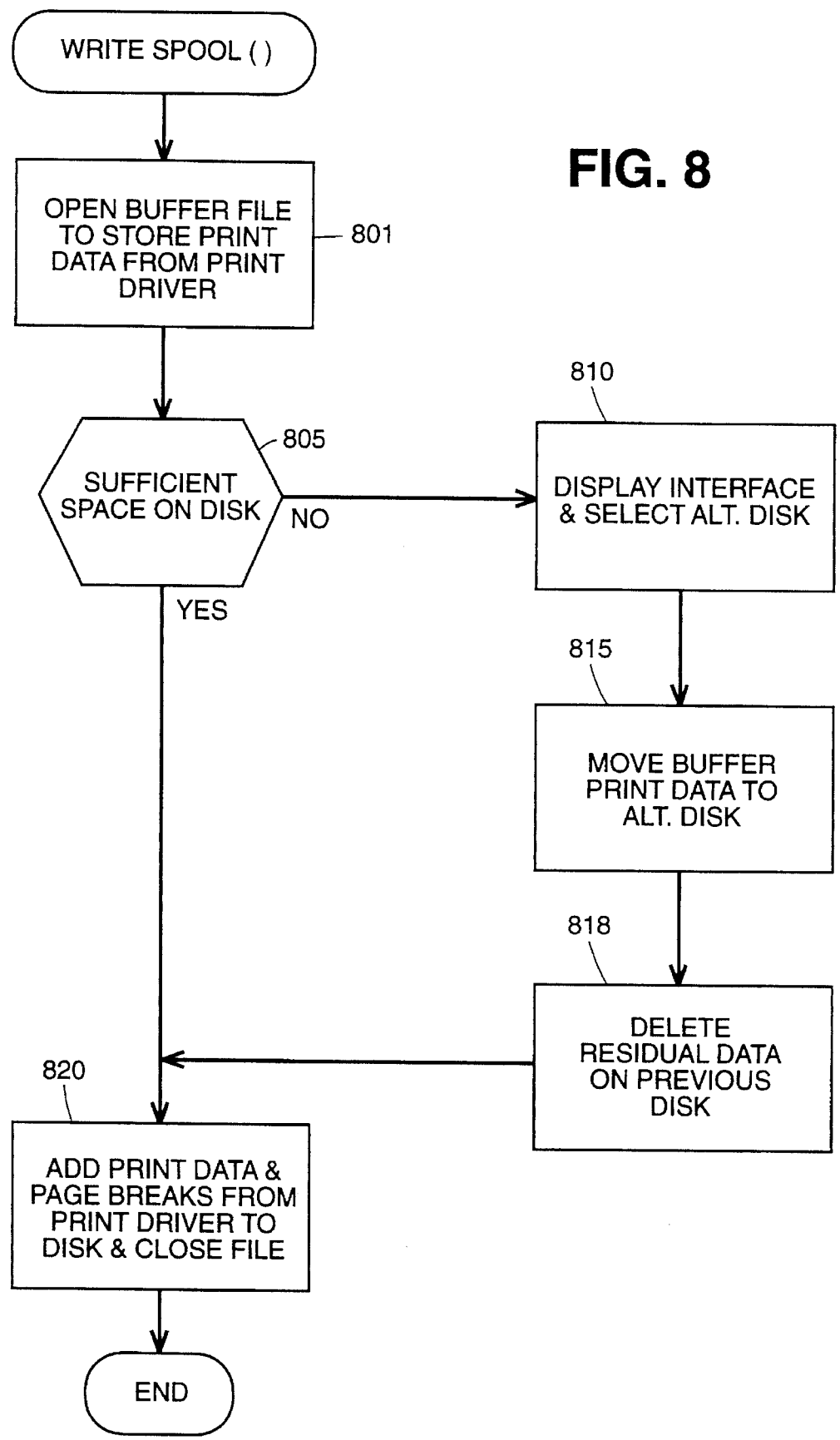

A WriteSpool() command is then issued by the print driver control 410 and intercepted by the document formatter control 415. The WriteSpool() command is intercepted by the document formatter control 415. State 3 of FIG. 6 is then entered and the operations shown in FIG. 8 are performed. In response to the WriteSpool() command, step 801 of FIG. 8 is entered and a buffer file to store the print data of the current page is opened. It is determined whether there is sufficient space on the assigned disk to store the print data in decision step 805. If the space in the assigned disk buffer is not sufficient, a user interface is displayed and the user is prompted to select an alternate disk for the buffer (step 810). The print data already stored is then moved to the selected alternate disk (step 815) and step 820 is entered. The alternative disk may be another one of disks 114-1 through 114-N or a disk at a remote location that is coupled to the circuit shown in FIG. 2 through the network interface 112 and cable 22. If there is sufficient space on the assigned disk, step 820 is entered directly from step 805. The print data of the page and page breaks are then written on the disk buffer and the print file is closed to protect the data. The buffer writing is indicated as write data to disk operation internal to state 3 in FIG. 6.

Figure 9:
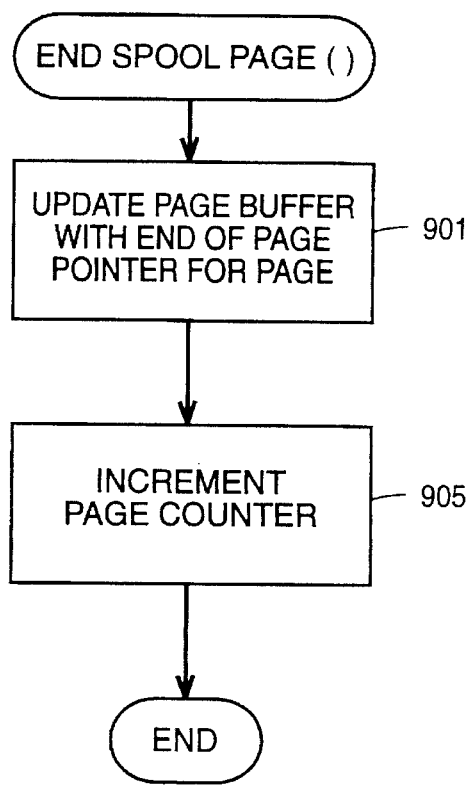

State 1 of FIG. 6 is reentered from state 3 when an EndSpoolPage() command from the windows print driver control 410 to the windows spooler control 420 is intercepted by the document formatter control 415 in FIG. 5. The operations of state 1 in response to the EndSpoolPage() are shown in the flow chart of FIG. 9. In step 901, the document formatter control 415 is operative to update the page buffer with an end of page pointer for the page written into the disk buffer. A page counter that keeps track of the number of pages in the document is then incremented in step 905. The operations of states 1, 2 and 3 are sequentially repeated for the succeeding pages to be printed in response to the StartSpoolPage(), WriteSpoolPage() and EndSpoolPage() commands until the print data, the page pointers and the page count for all the pages of the document to be printed are stored in the disk buffer 134 and the corresponding memory file.

Figure 10:
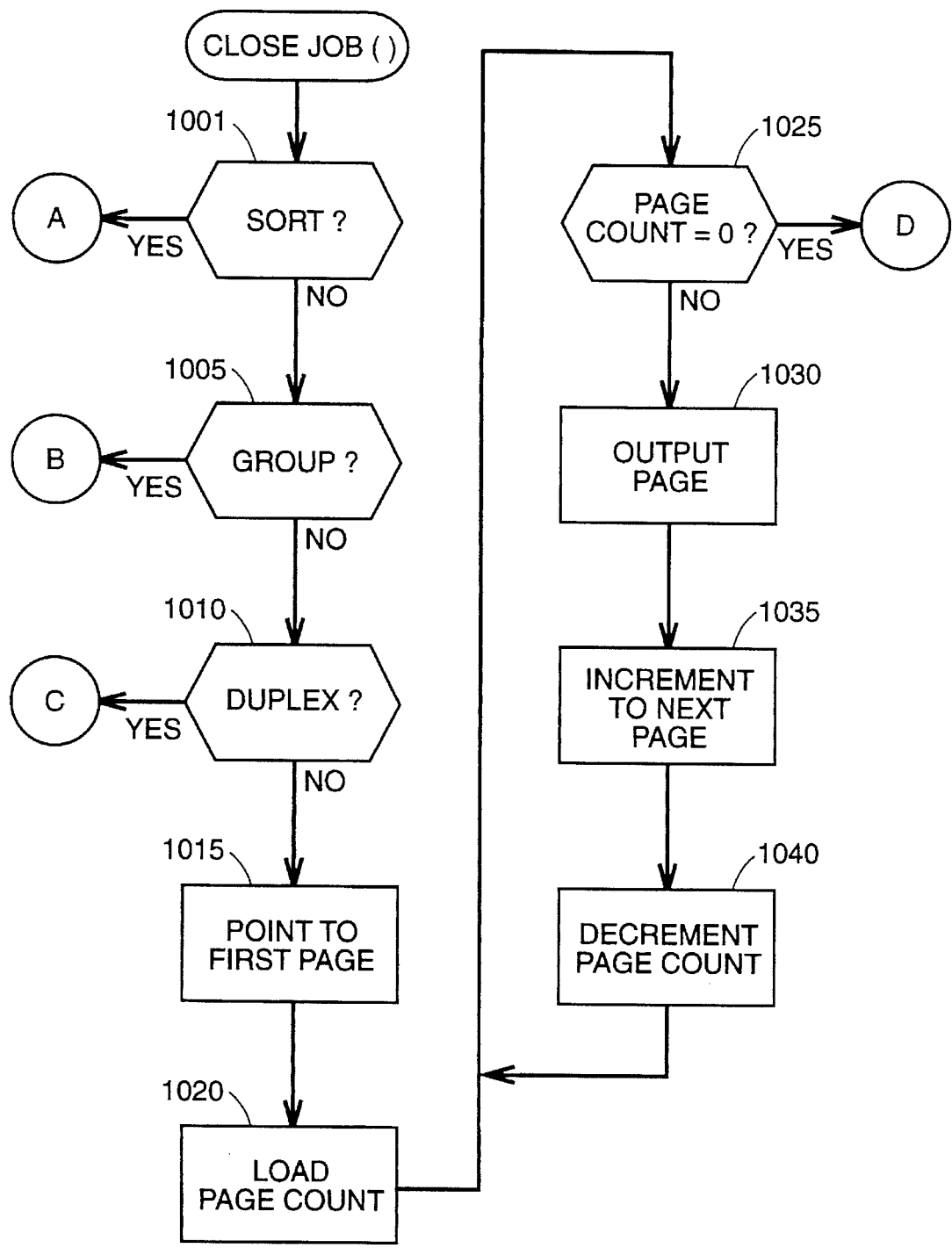

When a CloseJob() command is intercepted by the document formatter control 415 while the document format control is in state 1, state 4 is entered wherein the print data is reformatted according to the document handling feature previously selected. The reformatting operations responsive to the CloseJob() command are illustrated in FIGS. 10–14. In FIG. 10, decision steps 1001, 1005 and 1010 determine the operations based on whether the sort, group or duplex document handling feature has been selected in step 710 of FIG. 7. Assume initially, for purposes of illustration, that none of these document handling features has been selected. In that event, step 1015 is entered through decision steps 1001, 1005 and 1010 and the default document handling operation is started.

In steps 1015 and 1020, the page pointer is directed to the first page stored in the disk buffer and the page count corresponding to the number of pages in the document is loaded. The page count is compared to zero in decision step 1025. Until the page count equals zero in step 1025, the loop including steps 1025, 1030, 1035 and 1040 is iterated. In step 1030, the current page is outputted from the document formatter disk buffer to the windows spooler. In step 1035, the pointer is incremented to the next page and, in step 1040, the page count is decremented. The succeeding pages of the document are outputted to the windows spooler until the page count equals zero in step 1025. Accordingly, the windows spooler receives the pages in forward order first page, . . . , last page and the print data of the ordered pages is sent to the printing device from the windows spooler.

Figure 11:
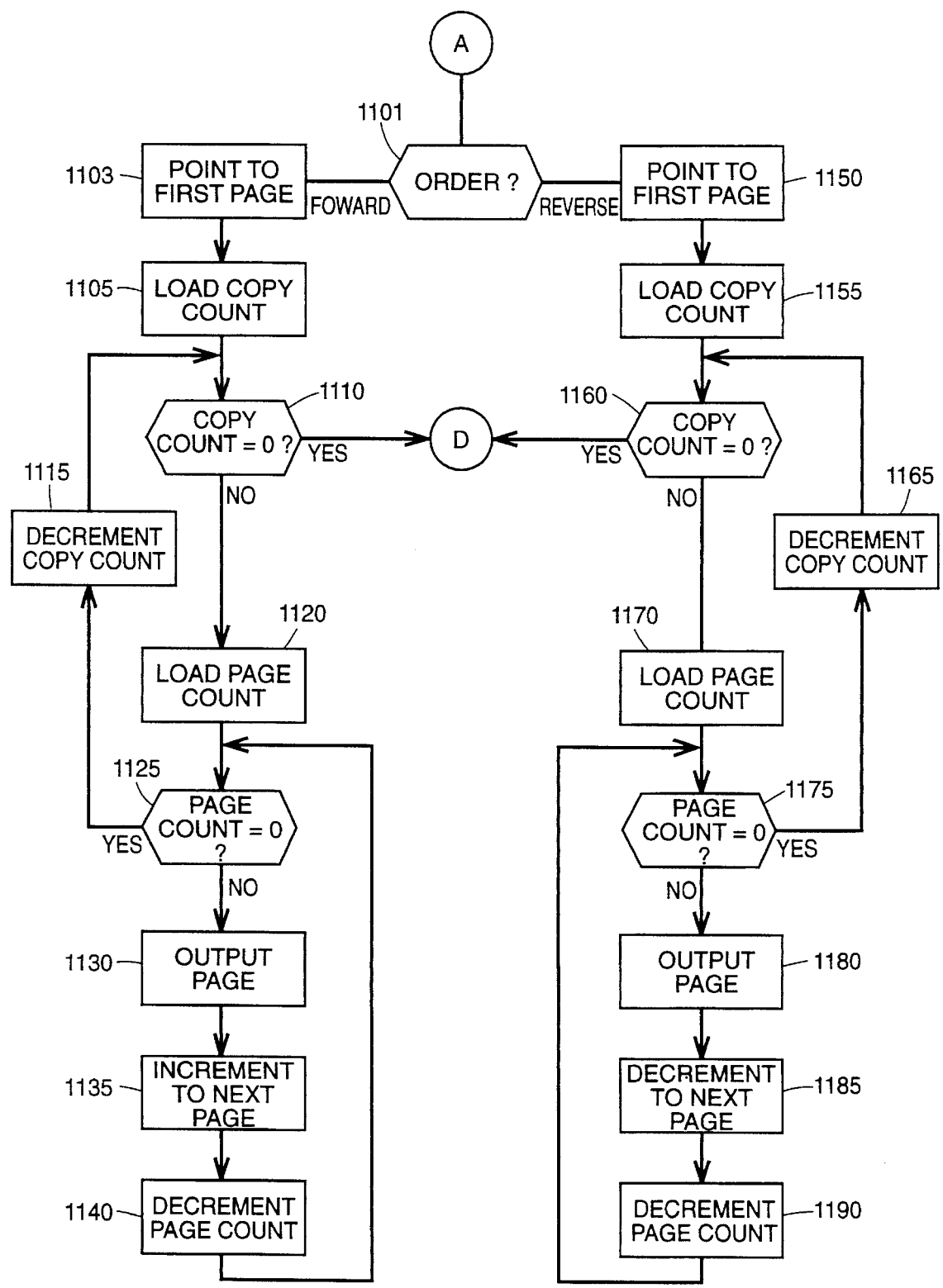

If the sort option has been selected when step 710 of state 1 is performed responsive to the OpenJob() command, the document format operation in FIG. 10 is redirected to step 1101 of FIG. 11 by decision step 1001. The sort processing may be selected, for example, to print three copies of a four page document. If this selection is made, the document formatter rearranges the document pages in either the forward or reverse order as shown in Table 1.

TABLE 1

| Forward | Reverse |
|---------|---------|
| Copy 1  | Copy 1  |
| Page 1  | Page 4  |
| Page 2  | Page 3  |
| Page 3  | Page 2  |
| Page 4  | Page 1  |
| Copy 2  | Copy 2  |
| Page 1  | Page 4  |
| Page 2  | Page 3  |
| Page 3  | Page 2  |
| Page 4  | Page 1  |
| Copy 3  | Copy 3  |
| Page 1  | Page 4  |
| Page 2  | Page 3  |
| Page 3  | Page 2  |
| Page 4  | Page 1  |

The sort reformatting of the document formatter control 415 when the forward order has been selected is illustrated in FIG. 11. With the forward selection in decision step 1101, the page pointer is set to point to the first page in step 1103 and the user specified copy count is loaded in step 1105. Decision step 1110 is then entered to compare the copy count to zero. If the copy count is not equal to zero, the page count is loaded in step 1120 and the loop including step 1125, step 1130 in which a pointed-to page is output to the windows spooler, step 1135 in which the page pointer is incremented by one to the next page and step 1140 in which the page count is decremented by one is entered. In decision step 1125, the page count is compared to zero. Until the page count equals zero the loop including steps 1125, 1130, 1135 and 1140 is iterated so that the pages are outputted in forward order to the windows spooler for the current copy. When the page count is zero in step 1125, the copy count is decremented by one in step 1115 and the value of the copy count is checked in step 1110. When the selected number of copies has been outputted to the windows spooler, the forward sort operations of FIG. 11 are completed.

If the reverse selection has been made, the page pointer is set to point to the last page in step 1150 and the copy count is loaded in step 1155. Decision step 1160 is then entered to compare the copy count to zero. As long as the copy count is not zero, the page count is loaded in step 1170 and the loop including step 1175, step 1180 in which a pointed-to page is output to the windows spooler, step 1185 in which the page pointer is decremented by one to the previous page and step 1190 in which the page count is decremented by one is entered. In decision step 1175, the page count is compared to zero. Until the page count equals zero, the loop including steps 1175, 1180, 1185 and 1190 is iterated so that the pages are outputted in reverse order to the windows spooler for the current copy. When the page count is zero in step 1175, the copy count is decremented by one in step 1165 and the value of the copy count is checked in step 1160. Upon the copy count reading zero in decision step 1160, the selected number of copies has been outputted to the windows spooler and the reverse sort operations of FIG. 11 are completed.

Figure 12:
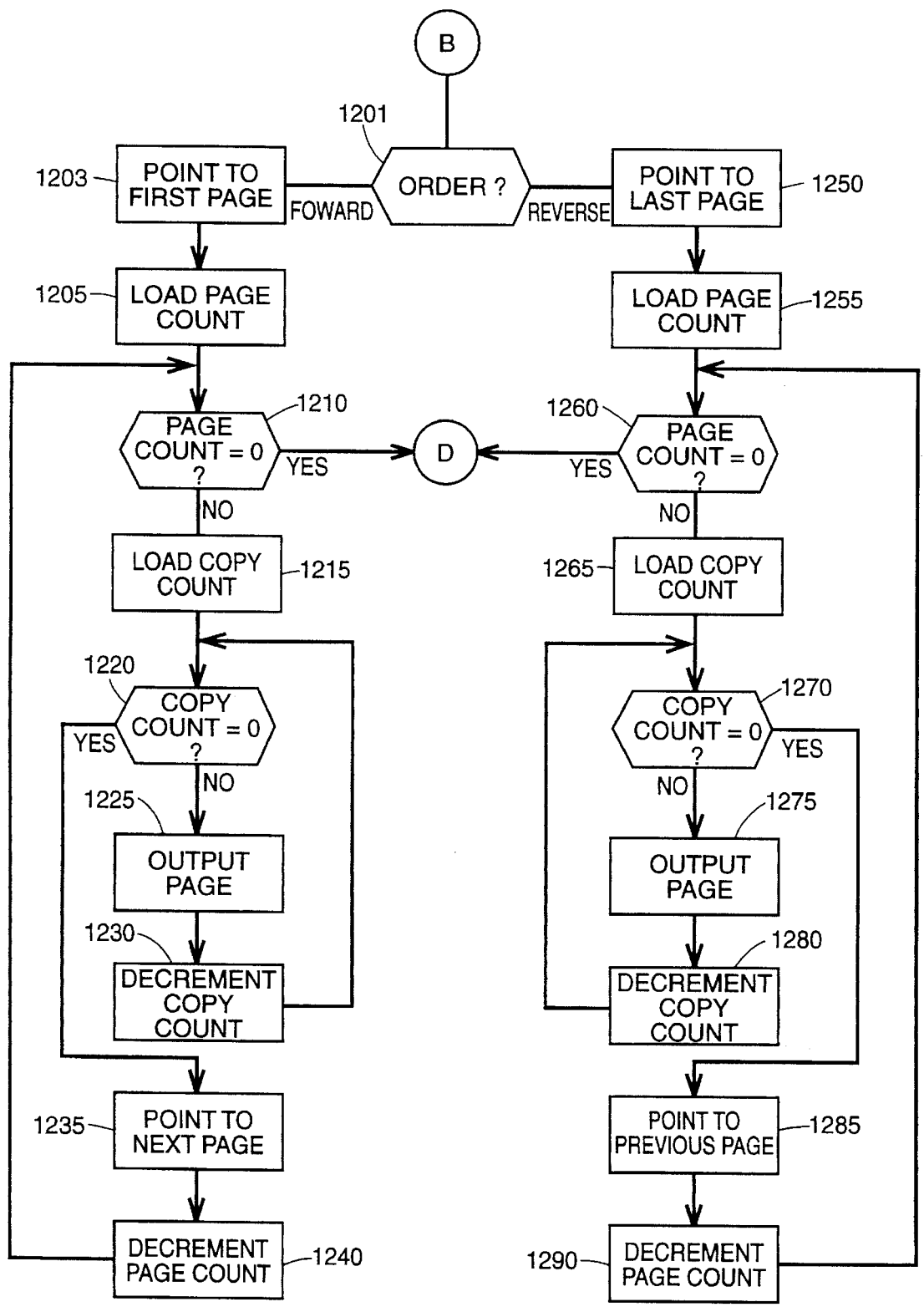

If the group option has been selected when step 710 of state 1 is performed responsive to the OpenJob() command, the document format operation in FIG. 10 is redirected to step 1201 of FIG. 12 by decision step 1005. The group processing may be selected to print three copies of a four page document. In that event, the document formatter 415 rearranges the document pages in either forward or reverse order as shown in Table 2.

TABLE 2

| Forward | Reverse |
|---------|---------|
| Page 1  | Page 4  |
| Page 1  | Page 4  |
| Page 1  | Page 4  |
| Page 2  | Page 3  |
| Page 2  | Page 3  |
| Page 2  | Page 3  |
| Page 3  | Page 2  |
| Page 3  | Page 2  |
| Page 3  | Page 2  |
| Page 4  | Page 1  |
| Page 4  | Page 1  |
| Page 4  | Page 1  |

With the forward selection the group reformatting, the page pointer is set to point to the first page in step 1203 and the page count is loaded in step 1205. Decision step 1210 is then entered to compare the page count to zero. If the page count is not equal to zero, the copy count is loaded in step 1215 and the loop including step 1220, step 1225 in which a pointed-to page is output to the windows spooler and step 1230 in which the copy count is decremented by one is iterated. When the copy count equals zero in decision step 1220, the page pointer is set to point to the next page in step 1235 and the page count is decremented in step 1240. Decision step 1210 is then reentered and the page count is checked therein. The loop including steps 1220, 1225 and 1230 is reentered through load copy count step 1215 and reiterated to provide the selected number of copies of the next page. When the copy count is again equal to zero, decision step 1210 is entered through steps 1235 and 1240 to prepare for outputting of the next page. If the page count is zero in decision step 1210, the selected number of grouped copies have been output to the windows spooler and the forward grouped reformatting operations are completed.

If the reverse selection has been made, the page pointer is set to point to the last page in step 1250 and the page count is loaded in step 1255. Decision step 1260 is then entered to compare the page count to zero. If the page count is not equal to zero, the copy count is loaded in step 1265 and the loop including step 1270, step 1275 in which a pointed-to page is output to the windows spooler and step 1280 in which the copy count is decremented by one is iterated. When the copy count equals zero in decision step 1270, the page pointer is set to point to the previous page in step 1285 and the page count is decremented in step 1290. Decision step 1260 is then reentered and the page count is checked therein. The loop including steps 1270, 1275 and 1280 is reiterated to provide the selected number of copies of the preceding page. When the copy count is again equal to zero, decision step 1260 is entered through steps 1285 and 1290 to prepare for outputting of the preceding page. If the page count is zero in decision step 1260, the selected number of grouped copies have been output to the windows spooler in reverse order and the grouped reformatting operations are completed.

Figure 13:
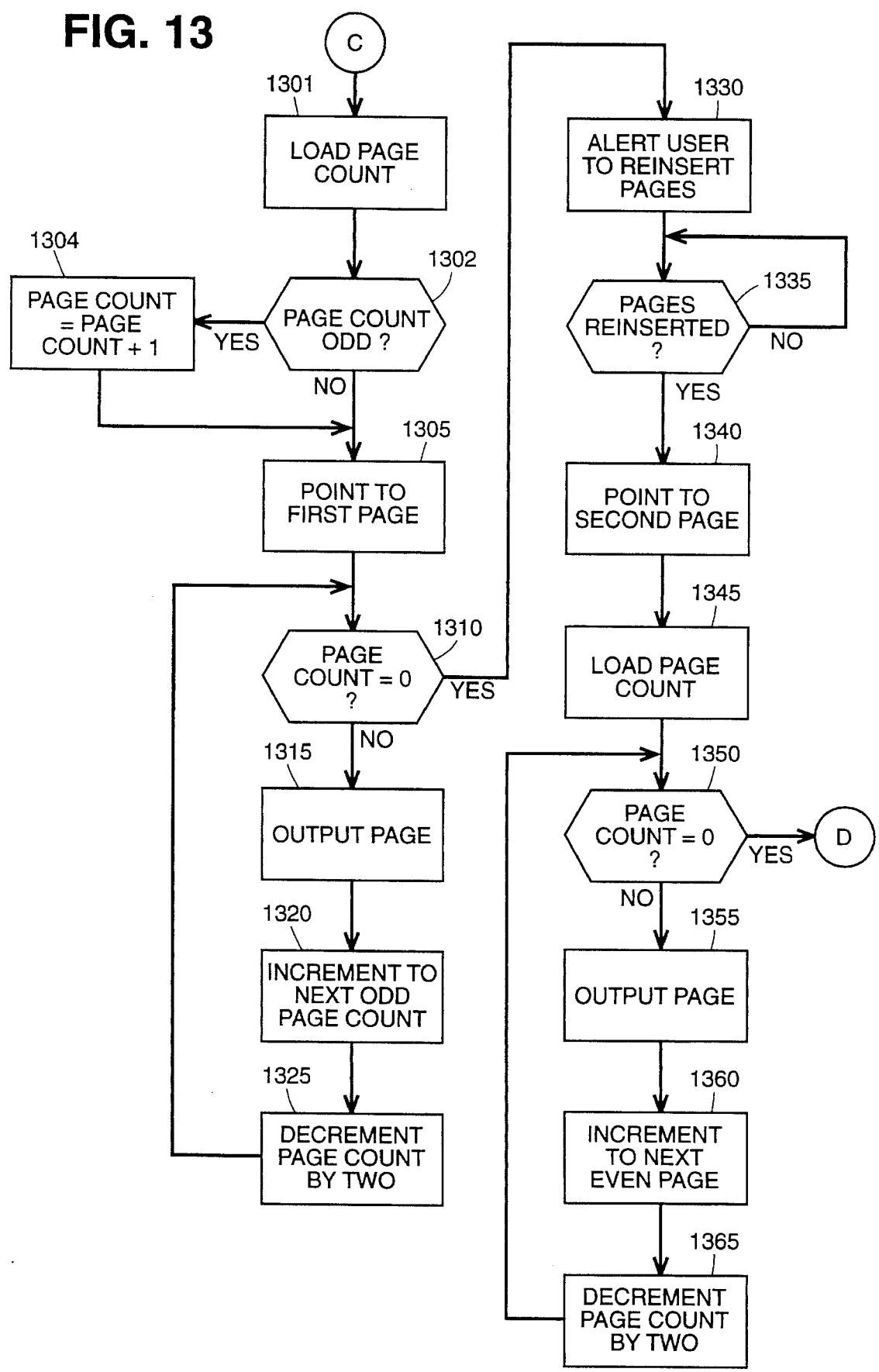

Duplex printing may be selected to provide printing on both sides of each page of a document. If duplex printing is selected, the operations shown in FIG. 13 are entered through steps 1001, 1005 and 1010 of FIG. 10 when the CloseJob() command is issued in state 1 of FIG. 6. Referring to FIG. 13, the page count is first loaded in step 1301 and whether the page count is odd is checked in decision step 1302. If odd, the page count is incremented by one in step 1304. Step 1305 is then entered in which the first page is pointed to. Decision step 1310 is then entered wherein the page count is compared to zero. Until the page count is equal to or less than zero, the loop including step 1310, step 1315 in which the pointed-to page is output to the windows spooler, step 1320 in which the page pointer is incremented by two to the next odd page and step 1325 in which the page count is decremented by two is iterated to output the odd pages to the window spooler and therefrom to the connected printer.

When the page count is equal to or less than zero in decision step 1310, step 1330 is entered and a displayed message alerts the user to reinsert the pages with blank sides in position to be printed. After the user has reinserted the pages so that the printing is performed on the blank sides, the user inputs a signal indicating that the pages have been reinserted in step 1335 and step 1340 is entered. The page pointer is set to the second page in step 1340 and the page count is loaded in step 1345. The loop including decision step 1350, step 1355 in which the pointed-to page is output to the windows spooler, step 1360 in which the page pointer is incremented by two to the next even page, and step 1365 in which the page count is decremented by 2, is iterated. When the page count is equal to or less than zero in decision step 1350, the forward duplex formatting has been completed. Duplex printing in reverse page order may be performed in a similar manner.

Figure 14:
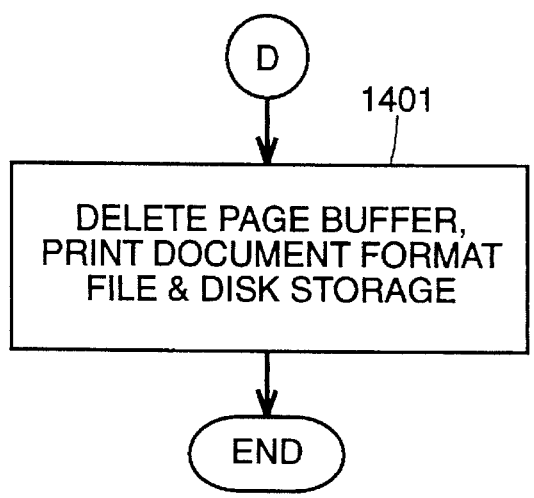
FIGS. 7 through 14 are flow charts showing the printing operations of the state diagram of FIG. 6 in greater detail.

Upon completion of the document formatting operations of FIGS. 10–13 in state 4, step 1401 of FIG. 14 is entered in which the page buffer, the document format file and the disk storage are deleted. The printer driver control is then signaled that the print job has been completed.

The invention has been described with respect to a particular illustrative embodiment. It is to be understood that the invention is not limited to the above described embodiment and that various changes and modifications may be made by those of ordinary skill in the art without departing from the spirit and scope of the invention.

What is claimed is:

1. A print control system comprising:

a memory partitioned into plural blocks respectively for storing an application block for controlling processing of information signals, a printer driver block for controlling conversion of information signals to print data, and a document formatting block;

a processor coupled to the memory for performing operations on the information signals according to control signals from the memory;

a print spooler coupled to the processor for storing the print data;

the processor being responsive to control signals of the printer driver block for converting information signals produced according to control signals of the application block to print data and for generating print command signals; and means for sending the print data and the print command signals from the processor to the print spooler, wherein the processor is responsive to control signals of the document format block to intercept the print data and the print command signals, to reformat the intercepted print data according to document formatting signals of the document format block, and to output the reformatted print data to the print spooler.

2. A print control system according to claim 1, further comprising a second memory for storing the intercepted print data and wherein the processor is responsive to the control signals of the document format block to reformat the stored intercepted print data.

3. A print control system according to claim 2, wherein the second memory comprises a plurality of disk storage means and means responsive to a count of the print data for selecting one of the plurality of disk storage means.

4. A print control system according to claim 1, further comprising means responsive to the control signals of the document format block for selecting at least one of a plurality of document format signals.

5. A print control system according to claim 4, wherein the processor is responsive to the selected document format signals to reverse the order of pages of the print data being outputted to the print spooler.

6. A print control system according to claim 4, wherein the processor is responsive to the selected document format signals to group pages of the print data being outputted to the print spooler.

7. A print control system according to claim 4, wherein the processor is responsive to the document format signals to produce duplex pages of the print data being outputted to the print spooler.

8. A print control system according to claim 4, wherein the processor is responsive to the document data format signals to produce multiple copies of the print data being outputted to the print spooler.

9. A print control system in a windows environment comprising:

a memory partitioned into plural block respectively for storing a windows application block for controlling processing of information signals, a windows printer driver block for controlling conversion of information signals to print data, and a document formatting block;

a processor coupled to the memory for performing operations on the information signals according to control signals from the memory;

a windows print spooler coupled to the processor for storing the print data;

the processor being responsive to control signals of the windows printer driver block for converting information signals produced according to control signals of the application block to print data and for generating windows spooler command signals; and means for sending the print data and the windows spooler command signals from the processor to the windows print spooler, wherein the processor is responsive to control signals of the document format block to intercept the windows print spooler command signals and the print data, to reformat the intercepted print data, and to output the reformatted print data windows to the windows print spooler.

10. A print control system in a windows environment according to claim 9, further comprising a second memory for storing the intercepted print data and wherein the processor is responsive to the control signals of the print document block to reformat the stored intercepted print data.

11. A print control system in a windows environment according to claim 10, wherein the second memory comprises a plurality of disk storage means and means responsive to a count of the print data for selecting one of the plurality of disk storage means.

12. A print control system in a windows environment according to claim 9, further comprising means responsive to the control signals of the document format block for selecting at least one of a plurality of document format signals.

13. A print control system in a windows environment according to claim 12, wherein the processor is responsive to the selected document format signals to reverse the order of pages of the print data being outputted to the print spooler.

14. A print control system in a windows environment according to claim 12, wherein the processor is responsive to the selected document format signals to group pages of the print data being outputted to the print spooler.

15. A print control system in a windows environment according to claim 12, wherein the processor is responsive to the selected document format signals to produce duplex pages of the print data being outputted to the print spooler.

16. A print control system in a windows environment according to claim 12, wherein the processor is responsive to the selected document format signals to produce multiple copies of the print data being outputted to the print spooler.

17. A print control method comprising the steps of:
   storing an application block to control processing of information signals, a printer driver block to control conversion of information signals to print data, and a document formatting block in a memory;
   processing the information signals according to the stored control signals including converting information signals produced according to control signals of the application block to print data and spooler command signals responsive to control signals of the print driver block; and
   sending the print data and the spooler command signals to a print spooler;
   intercepting the print data and the spooler command signals responsive to control signals from the document formatting block;
   reformatting the print data responsive to control signals of the document formatting block; and
   sending the reformatted print data to the print spooler.

18. A print control method according to claim 17, wherein the intercepted print data is stored and the stored intercepted print data is reformatted.

19. A print control method according to claim 18, wherein the intercepted print data is stored on one of a plurality of disk storage units selected responsive to a count of the intercepted print data.

20. A print control method according to claim 17, further comprising the step of selecting at least one of a plurality of document format signals responsive to the control signals of the document formatting block.

21. A print control method according to claim 20, wherein the print data is reformatted by reversing an order of pages of the print data responsive to the selected document format signals.

22. A print control method according to claim 20, wherein the print data is reformatted by grouping pages of the print data responsive to the selected document format signals.

23. A print control method according to claim 20, wherein the print data is reformatted by producing duplex pages of the print data responsive to the selected document format signals.

24. A print control method according to claim 20, wherein the print data is reformatted by producing multiple copies of the print data responsive to the selected document format signals.

25. Computer executable process steps which format document information to be sent to a print spooler, the process steps including:
   a storing step which stores document formatting control signals;
   a converting step which converts the document information to print data and print spooler command signals;
   a first sending step which sends the print data and print spooler command signals to the print spooler;
   an intercepting step which intercepts the print data and the print spooler command signals sent to the print spooler;
   a reformatting step which reformats the intercepted print data responsive to the document formatting control signals; and
   a second sending step which sends the reformatted print data to the print spooler.

* * * * *